US006346948B1

(12) United States Patent
Evans et al.

(10) Patent No.: US 6,346,948 B1
(45) Date of Patent: *Feb. 12, 2002

(54) METHOD AND APPARATUS FOR PIXEL COMPOSITION

(75) Inventors: Jerald Evans, Mountain View; James Graham, Sunnyvale; Thanh Nguyen, Palo Alto, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/498,197

(22) Filed: Feb. 4, 2000

Related U.S. Application Data

(63) Continuation of application No. 08/884,843, filed on Jun. 30, 1997, now Pat. No. 6,034,694.

(51) Int. Cl.[7] ................................................ G06T 11/60

(52) U.S. Cl. ...................... 345/582; 345/597; 345/619

(58) Field of Search ................................ 345/435, 430, 345/431, 582, 597, 619

(56) References Cited

U.S. PATENT DOCUMENTS

| | | | |
|---|---|---|---|
| 5,291,585 A | 3/1994 | Sato et al. ..................... 710/10 |
| 5,335,320 A | 8/1994 | Iwata et al. ..................... 717/4 |
| 5,345,550 A | 9/1994 | Bloomfield ................. 345/353 |
| 5,347,627 A | 9/1994 | Hoffmann et al. .......... 345/334 |
| 5,384,911 A | 1/1995 | Bloomfield ................. 345/333 |
| 5,412,772 A | 5/1995 | Monson ....................... 345/335 |
| 5,414,806 A | 5/1995 | Richards ..................... 345/435 |
| 5,423,034 A | 6/1995 | Cohen-Levy et al. ......... 707/10 |
| 5,430,836 A | 7/1995 | Wolf et al. .................. 345/335 |
| 5,436,637 A | 7/1995 | Gayraud et al. ............ 345/116 |
| 5,448,695 A | 9/1995 | Douglas et al. ............. 345/347 |
| 5,461,399 A | 10/1995 | Cragun ....................... 345/415 |
| 5,461,710 A | 10/1995 | Bloomfield et al. ......... 345/349 |

(List continued on next page.)

OTHER PUBLICATIONS

Ronald L. Johnston, "The Dynamic Incremental Compiler of APL/3000" Proceedings of the API '79 Conference, published as APL Quote Quad, 9(4), p 82–87.

Leo J. Guibas et al., "Compilation and Delayed Evaluation in APL," Fifth Annual Synposium on Principles in Programming Languages, p 1–8, 1978.

Gleen Krasner "The Smalltalk–80 Virtual Machine" BYTE Publications Inc., Aug. 1991, pp 300–320.

Thomas Porter et al. "Compositing Digital Images" Association for Computing Machinery (ACM), 1984, pp. 253–259.

Primary Examiner—Mark Zimmerman
Assistant Examiner—Hoedung X. Cao
(74) Attorney, Agent, or Firm—The Hecker Law Group

(57) ABSTRACT

The present invention provides a method and apparatus that permits the introduction of customized compositing techniques into an application by a developer. A Composite interface and a CompositeContext interface are defined. Custom compositing operations can be defined by implementing these interfaces. A Composite object provides a CompositeContext object that holds the state and performs the compositing work. Multiple CompositeContext objects can be created from one Composite object to maintain separate states in a multi-threaded environment. An object implementing the Composite interface can be set as rendering state on a graphics object that provides rendering methods. This allows arbitrary compositing rules to be used by a developer. In one implementation of the Composite and CompositeContext interfaces, an AlphaComposite class is defined. The AlphaComposite class implements common compositing rules, such as defined by Porter and Duff, for combining source and destination pixels to achieve blending and transparency effects with graphics and images.

66 Claims, 4 Drawing Sheets

U.S. PATENT DOCUMENTS

| | | | |
|---|---|---|---|
| 5,473,745 A | 12/1995 | Berry et al. | 714/45 |
| 5,491,784 A | 2/1996 | Douglas et al. | 345/352 |
| 5,493,638 A | 2/1996 | Hooper et al. | 345/435 |
| 5,509,116 A | 4/1996 | Hiraga et al. | 707/1 |
| 5,526,517 A | 6/1996 | Jones et al. | 707/8 |
| 5,544,288 A | 8/1996 | Morgan et al. | 345/342 |
| 5,546,519 A | 8/1996 | Berry | 345/326 |
| 5,548,702 A | 8/1996 | Li et al. | 345/346 |
| 5,550,968 A | 8/1996 | Miller et al. | 345/332 |
| 5,559,942 A | 9/1996 | Gough et al. | 345/349 |
| 5,564,003 A | 10/1996 | Bell et al. | 345/326 |
| 5,566,330 A | 10/1996 | Sheffield | 707/4 |
| 5,570,462 A | 10/1996 | McFarland | 345/436 |
| 5,572,643 A | 11/1996 | Judson | 709/218 |
| 5,638,499 A * | 6/1997 | O'Connor et al. | 345/431 |
| 5,638,502 A | 6/1997 | Murata | 345/435 |
| 5,652,851 A | 7/1997 | Stone et al. | 345/346 |
| 5,694,603 A | 12/1997 | Reiffin | 709/107 |
| 5,694,604 A | 12/1997 | Reiffin | 709/107 |
| 5,740,343 A * | 4/1998 | Tarolli et al. | 345/430 |
| 5,745,121 A * | 4/1998 | Politis | 345/433 |
| 6,034,694 A * | 3/2000 | Evans et al. | 345/433 |
| 6,130,676 A * | 10/2000 | Wise et al. | 345/433 |

* cited by examiner

METHOD AND APPARATUS FOR PIXEL COMPOSITION

This is a continuation of application Ser. No. 08/844,843 filed Jun. 30, 1997 now U.S. Pat. No. 6,034,694.

BACKGROUND OF THE PRESENT INVENTION

1. Field of the Invention

This invention relates to the field of object-oriented computer graphics and imaging.

2. Background Art

In computer graphics applications there is a technique for combining two images known as "compositing". One example of compositing is the blending of a new screen object of one color with an existing screen object of another color. This color blend is accomplished using a well known compositing technique known as alpha compositing, such as described by T. Porter and T. Duff, "Compositing Digital Images", SIGGRAPH 84, pp. 253–259. A problem with current schemes for providing compositing in computer systems is a difficulty in adding different compositing techniques. Currently, available compositing schemes are hard coded algorithms and are often tied to specific hardware implementations. This discourages or prevents the addition of customized compositing schemes.

SUMMARY OF THE INVENTION

The present invention provides a method and apparatus that permits the introduction of customized compositing techniques into an application by a developer. A Composite interface and a CompositeContext interface are defined. Custom compositing operations can be defined by implementing these interfaces. A Composite object provides a CompositeContext object that holds the state and performs the compositing work. Multiple CompositeContext objects can be created from one Composite object to maintain separate states in a multi-threaded environment.

An object implementing the Composite interface can be set as rendering state on a graphics object that provides rendering methods. This allows arbitrary compositing rules to be used by a developer. In one implementation of the Composite and CompositeContext interfaces, an Alpha-Composite class is defined. The AlphaComposite class implements common compositing rules, such as defined by Porter and Duff, for combining source and destination pixels to achieve blending and transparency effects with graphics and images.

DETAILED DESCRIPTION OF THE INVENTION

A method and apparatus for implementing compositing operations is described. In the following description, numerous specific details are set forth in detail to provide a more thorough description of the present invention. It will be apparent, however, to one skilled in the art, that the present invention may be practiced without these specific details. In other instances, well known features have not been described in detail so as not to obscure the present invention.

Figure 1:
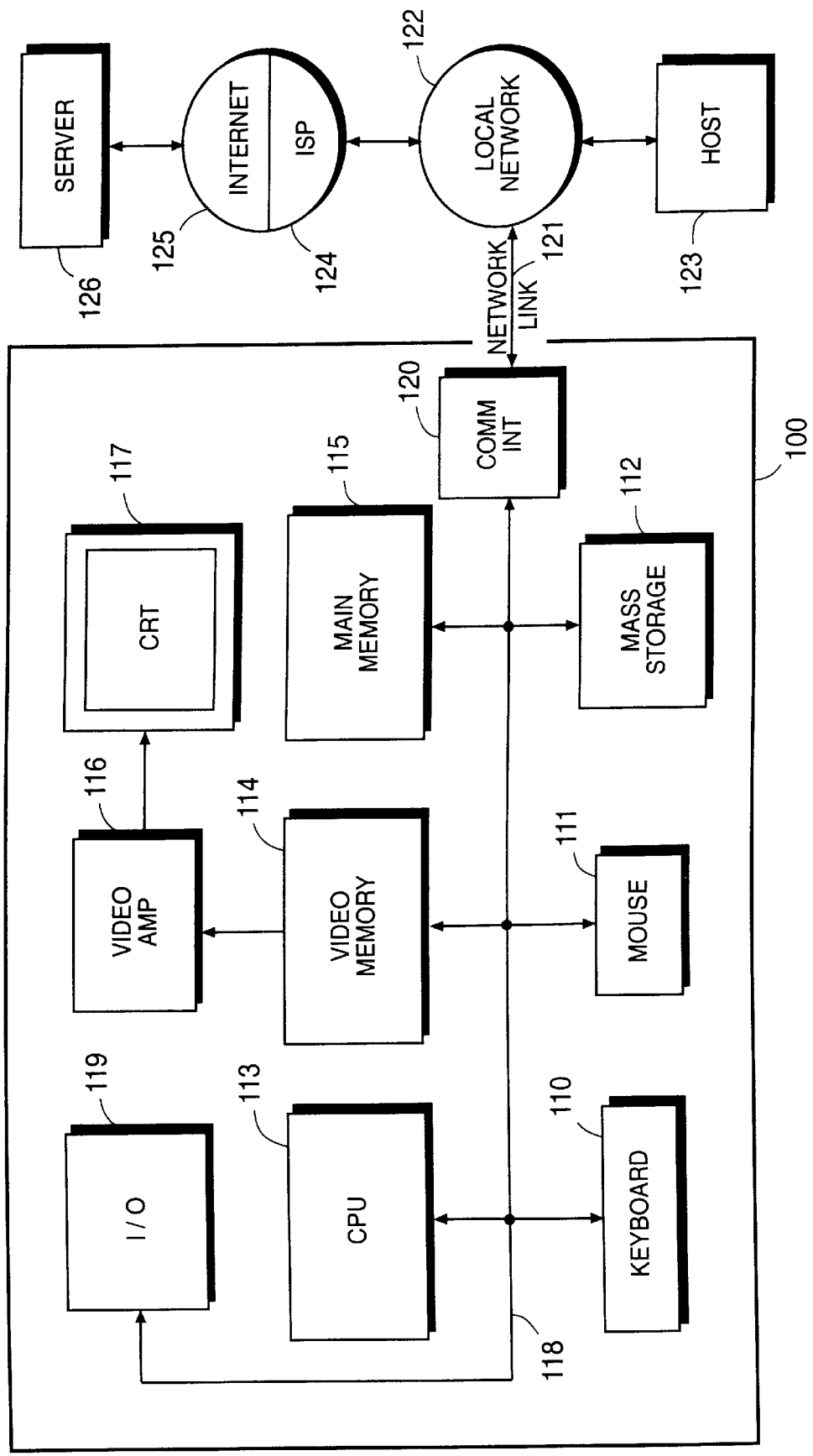
FIG. 1 is a block diagram of a computer system used with an embodiment of the invention.

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120. In accord with the invention, one such downloaded application is the apparatus for pixel composition described herein.

The received code may be executed by CPU 113 as it is received, and/or stored in mass storage 112, or other non-volatile storage for later execution. In this manner, computer 100 may obtain application code in the form of a carrier wave.

The computer system described above is for purposes of example only. An embodiment of the invention may be implemented in any type of computer system or programming or processing environment.

The present invention provides interfaces that define the methods to compose a source drawing primitive or image with a drawing destination. Multiple object classes may be defined to implement the interfaces. The preferred embodiment of the invention is implemented in the Java 2D API developed by Sun Microsystems, Inc. of Mountain View, Calif. The following is background on Java and on object oriented programming.

Java is an object-oriented programming language. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software program can be written using an object-oriented programming language whereby the program's functionality is implemented using objects.

Drawing Model

The Java 2D API uses the drawing model defined by the java.awt package for drawing to the screen: each Component object implements a paint method that is invoked automatically whenever something needs to be drawn. When paint is invoked, it is passed a Graphics object that knows how to draw into the component.

Assume a component whose job it is to draw a red rectangle. To draw the rectangle using java.awt, first implement Component.paint:

public void paint(Graphics g) { g.setColor(Color.red);

g.fillRect(300, 300, 200, 100);

}

This example illustrates the basic drawing process for any component:

1. Specify the rendering attributes for the shape to be drawn by calling one of the Graphics attribute methods, such as setColor.
2. Define the shape to be drawn, such as a rectangle.
3. Use the Graphics object to render the shape by calling one of the Graphics rendering methods, such as fillRect.

The basic drawing process is the same when using Java 2D API features. The Java 2D API provides additional features for specifying fancy paint styles, defining complex shapes, and controlling the rendering process. For instance, Graphics2D extends Graphics to support advanced drawing operations.

Figure 4:
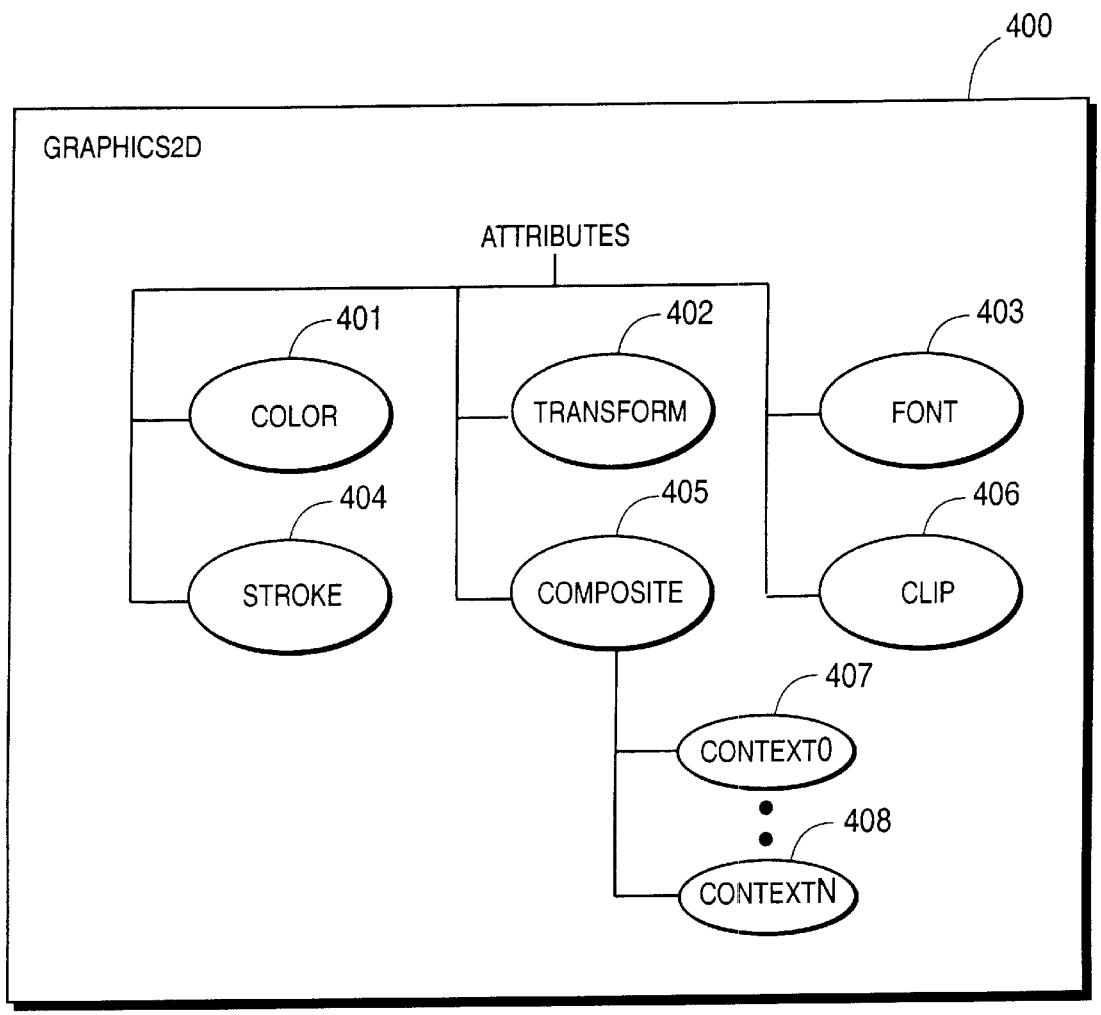
FIG. 4 illustrates an example of a Graphics2D object containing multiple rendering attributes.
Figure 2:
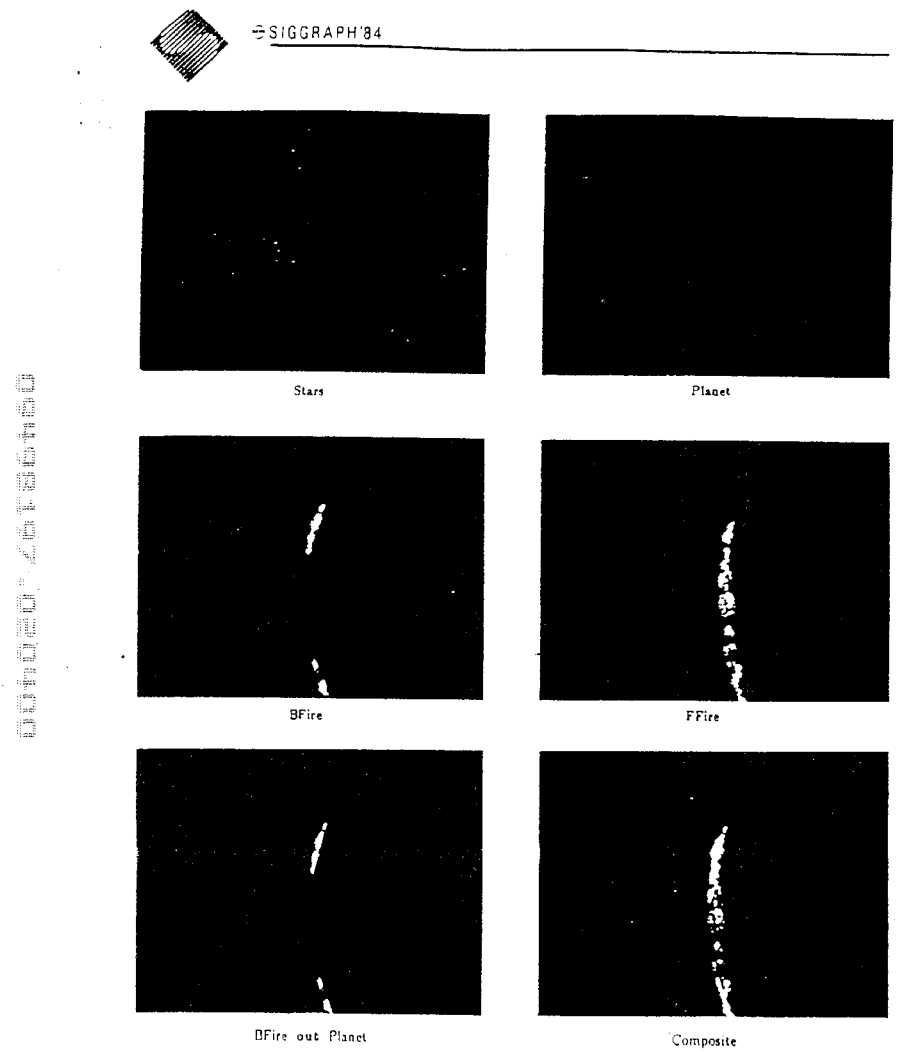

The Graphics2D object contains multiple rendering attributes which specify how particular rendering operations should be performed to implement the advanced drawing operations. FIG. 4 illustrates a sample Graphics2D object containing multiple rendering attributes. In FIG. 4, Graphics2D object 400 contains the following attributes: Color 401, Transform 402, Font 403, Stroke 404, Composite 405, and Clip 406. These attributes are represented by objects which contain rendering behavior definitions, including behavior parameters and methods for setting the parameters.

For example, Color 401 contains information regarding the color value of a drawing operation, and has constructors for creating Color objects with specific color values. Transform 402 contains information on a geometric transformation. Font 403 may contain information such as font style and family definitions for text drawing operations. Stroke 404 may contain pen style information such as pen shape and width, and line and segment characteristics. Clip 406 may contain information on how an image is clipped during rendering.

Composite 405 contains the definition of how images are combined, such as how pixels from two source images are blended to form pixels in a destination image. A Composite object may also have an associated context object or objects, such as Context0 407 and ContextN 408 associated with Composite 405. The method for creating the composite context instances is provided within the composite object. The composite context object encapsulates the method for carrying out the compositing operation. Because the composite context object maintains state for specific compositing operations, multiple context objects may be instantiated in a multi-threaded environment to reflect the particular compositing state for individual threads.

Component.paint is overloaded to support the Java 2D API drawing features. Referring to our rectangle example, the red rectangle could be drawn by implementing Component.paint (Graphics2D ):

```
public void paint (Graphics2D g2d) {

// 1. Specify the rendering attributes g2d.setColor (Color.red);

// 2. Define the shape. (Use Even-Odd rule.)

GeneralPath    path=new    GeneralPath
       (GeneralPath.EVEN_ODD);

path.moveTo(300.0f, 400.0f); // lower left corner path.lineTo(500.0f, 400.0f); // lower right corner path.lineTo(500.0f, 300.0f); // upper right corner path.lineTo(300.0f, 300.0f); // upper left corner path.closePath( ); // close the rectangle // 3. Render the shape g2d.fill(path);

}
```

The process is the same, but the Java 2D API class GeneralPath is used to define the rectangle. The GeneralPath class is defined in more detail in the co-pending patent application entitled "Representing a Path as an Object with Transformation Capability" Ser. No. 08/885,620 filed on Jun. 30, 1997, assigned to the assignee of the present invention, and incorporated herein by reference.

1. Specify the Rendering Attributes

With the Java 2D API classes, a shape may be filled with a solid color, but the Java 2D API also supports more complex fills such as gradients and patterns, as well as programmable compositing operations.

2. Define a Shape, a Text String, or an Image

The Java 2D API treats paths, text, and images uniformly; they can all be rotated, scaled, skewed, and composited. In this example, a single rectangle is defined.

The Java 2D API provides an implementation of the Shape interface that can be used to define complex shapes. This class, GeneralPath, allows you to describe a shape using a combination of lines and Bezier curves.

Using GeneralPath to define a shape also allows you to control the location of the shape. (The shape can also be translated to a new position using the Graphics 2D transformation attribute.)

Winding Rules

The GeneralPath constructor takes a parameter that specifies the winding rule to be used for the object. The winding rule is used to determine whether or not a point lies inside the shape when path segments cross. Two different winding rules can be specified for a GeneralPath object: the even-odd winding rule or the nonzero winding rule. The even-odd rule is specified in this example, but has no effect as the path segments in the rectangle do not cross.

3. Render the Shape, Text String, or Image.

To actually render the shape, text, or image, call the Graphics2D rendering methods. In this example, the rectangle is rendered using fill.

Transformations

In the Java 2D API, objects are processed by an AffineTransform associated with the Graphics2D object before they are drawn. An AffineTransform object takes a point or a path and transforms it to a new point or path. The default AffineTransform object created when the Graphics2D object is constructed performs simple scaling to device coordinates. To get effects such as rotation, translation, or custom scaling, create an AffineTransform object and apply it to the Graphics2D object.

Managing Complex Drawing Operations

Suppose that you want to draw a second rectangle, covering part of the first rectangle, rotated 45° counterclockwise. The new rectangle is filled with blue and rendered 50% transparent, so that the original rectangle is still visible underneath. With the Java 2D API, the second rectangle can easily be added to the previous example:

```
public void paint (Graphics 2D g2d) { g2d.setColor (Color.red);

// 2. Define the shape. (Use Even-Odd rule.)

GeneralPath    path=new    GeneralPath
       (GeneralPath.EVEN_ODD);

path.moveTo(0.0f, 0.0f); // lower left corner path.lineTo(200.0f, 0.0f); // lower right corner path.lineTo(200.0f, −100.0f); // upper right corner
```

```
path.lineTo(0.0f, -100.0f); // upper left corner path.closePath( ); // close the rectangle AffineTransform at=new AffineTransform( );

at.setToTranslation (300.0, 400.0);

g2d.transform(at);

g2d.fill(path);

// Add a second rectangle g2d.setColor(Color.blue); // define the color

AlphaComposite comp=

AlphaComposite.getInstance(Alphacomposite.SRC_
    OVER, 0.5);

g2d.setComposite(comp); // set the composite mode

// Rotate about the origin -45 degrees in radians at.setToRotation (-Math.PI/4.0);

g2d.transform(at);

g2d.fill(path);

}
```

The drawing process is the same for both rectangles:
*The rectangle is defined using a GeneralPath object.
*The rendering attributes are set by calling setColor. For the second rectangle, setcomposite is called as well.
*Transformations are applied before the rectangle is rendered.
(Graphics2d.transform is used to position both rectangles at (300,400) and rotate the blue rectangle 45° counterclockwise.)
*The rectangle is rendered by calling fill. In addition, before the blue rectangle is rendered, a compositing operation is specified by creating an instance of Alpha Composite.

1. Defining the Color and Composite

To paint the second rectangle with a 50% transparent blue, you first set the color to be painted.

Then, you indicate how the new color blends with existing colors. To do this, create an AlphaComposite object. An AlphaComposite object specifies how colors are blended. In this case, create an AlphaComposite object that sets the transparency for rendering to 50% and blends the new color over the existing color. To do this, specify the SRC_OVER operation and an alpha value of 0.5 when you create the AlphaComposite object. Then call Graphics2D .setComposite to use the new Composite object.

2. Defining the Rotation

The rotation is performed by creating a new AffineTransform and calling setToRotation to specify the counterclockwise rotation of 45 degrees. The transform is then composed with the previous transform of the Graphics2D object (the translation to (300,400)) by calling Graphics2D. transform.

3. Rendering the Blue Rectangle

Just like the first rectangle, the blue rectangle is rendered by calling fill.

The Graphics2D object transforms the path, using the specified AffineTransform object. The result is a rotated rectangle. It uses the specified color, blue, to determine what color the output should be. This color is then blended with the colors of the underlying image, based on the state of the Composite object and the Color object.

Composite

In the present invention, the AlphaComposite class is an implementation of the Composite interface. This class supports a number of different composition styles. Instances of this class embody a composition rule that describes how to blend a new color with an existing one. The alpha values for rendering are derived from a Color, Paint, or Image object, combined with pixel coverage information from a rasterized path (when antialiased rendering is being performed).

Managing Transparency

One commonly used compositing rule in the Alpha Composite class is SRC_OVER. When AlphaComposite.SRC_OVER is applied, it indicates that the new color (the source color) should be blended over the existing color (the destination color). The alpha value indicates, as a percentage, how much of the existing color should show through the new color. It is a measure of the transparency of the new color. Opaque colors don't allow any existing color to show through, while transparent colors let all of the existing color show through.

An AlphaComposite object can be used to add an additional level of transparency to what is drawn. To do this, create an alpha Composite object with an alpha value that increases the transparency of every object drawn:

```
comp=AlphaComposite.getInstance(AlphaComposite.SRC_OVER, 0.5);
```

The specified alpha value, 0.5, is combined with the alpha values of a Color, Paint, or Image prior to rendering. This reduces the alpha of everything drawn by 50%, making everything 50% more transparent.

A new type of compositing operation can be created by implementing the Composite and CompositeContext interfaces. A Composite object provides a CompositeContext object that actually holds the state and performs the composite work. Multiple CompositeContext objects can be created from one Composite object to maintain the separate states in a multi-threaded environment. The Composite and CompositeContext interfaces are described below.

Composite Interface

The Composite interface is a public interface, and, together with the CompositeContext interface, defines the methods to compose a source drawing primitive or image with the underlying graphics area. The Composite is set in the Graphics2D object and thereafter, whenever a shape, text, or an image is drawn, the Composite will combine the source with the colors that have already been drawn, according to rules defined by the Composite object. The classes implementing this interface will provide the rules and a method to create the context for a particular operation. CompositeContext is an environment used by the compositing operation that a Graphics2D object must create prior to the start of the operation. CompositeContext contains various private information and resources needed for a compositing operation. When the CompositeContext is no longer needed it is disposed of by the Graphics2D object to reclaim resources allocated for the operation.

Instances of classes implementing Composite should be immutable (i.e. read-only) because the Graphics2D object does not clone these objects when they are set as an attribute with the setComposite method or when the Graphics2D object is itself cloned. This is to avoid undefined behavior of Graphics2D rendering which would result if the Composite object were modified after being set in the Graphics2D state.

In the preferred embodiment of the present invention, a method of the Composite interface is createContext (public abstract CompositeContext createContext (ColorModel srcColorModel, ColorModel dstColorModel)). This method creates a context for the compositing operation. The context contains state that is used to perform the compositing operation. In a multi-threaded environment several contexts may exist simultaneously for a single Composite object. The parameters srcColorModel and dstColorModel are the ColorModel of the source and destination respectively. The method returns the CompositeContext object to perform the compositing operation.

CompositeContext Public Interface

The CompositeContext interface defines the encapsulated and optimized environment for the compositing operation. CompositeContext objects maintain state for compositing operations. In a multi-threaded environment, several contexts may exist simultaneously for a single Composite object.

Methods disposeContext public abstract void dispose( )

Release resources allocated for context.

compose public abstract void compose(Tile src1, Tile src2, Tile dst)

This method composes the first source tile with the second source tile and places the result in the destination tile. If one of the source tiles is the same as the destination tile, then the operation is effectively a single source to single destination compose operation.

Parameters:
src1—The first source tile for the compositing operation.
src2—The second source tile for the compositing operation.
dst—The destination tile for the result of the compositing operation.

The Composite Interface is implemented in one embodiment of this invention by an AlphaComposite class described below.

AlphaComposite Public Class

This class implements basic alpha compositing rules for combining 10 source and destination pixels to achieve blending and transparency effects with graphics and images. The rules implemented by this class are a subset of the Porter-Duff rules described in T. Porter and T. Duff, "Compositing Digital Images", SIGGRAPH 84, pp. 253–259 of Appendix A.

If any input does not have an alpha channel, an alpha value of 1.0 (completely opaque) is assumed for all pixels.

A constant alpha value can also be specified to be multiplied with the alpha value of the source pixels.

The following description is in terms of a single source to single destination compositing operation. The following abbreviations are used in the description of the rules:

Cs=one of the Color components of the Source Pixel.
Cd=one of the Color components of the Destination Pixel.
As=Alpha component of the Source Pixel.
Ad=Alpha component of the Destination Pixel.
Fs=fraction of the Source Pixel which contributes to the output.
Fd=fraction of the input Destination Pixel which contributes to the output.

The color and alpha components produced by the compositing operation are calculated as follows:

$$Cd=Cs*Fs+Cd*Fd$$

$$Ad=As*Fs+Ad*Fd$$

where Fs and Fd are specified by each rule. The above equations assume that both source and destination pixels have the color components premultiplied by the alpha component. Similarly, the equations expressed in the definitions of compositing rules below assume premultiplied alpha.

For performance reasons, it is preferable that Tiles passed to the compose method of a CompositeContext object created by the AlphaComposite class have premultiplied data. However, if either source or destination Tiles are not premultiplied, appropriate conversions are performed before and after the compositing operation.

The resulting alpha of the compositing operation is stored in the destination if the destination has an alpha channel. Otherwise, the resulting color is divided by the resulting alpha before being stored in the destination and the alpha is discarded (if the alpha value is 0.0, the color values are set to 0.0).

Variables

CLEAR public final static int CLEAR

Porter-Duff Clear rule. Both the color and the alpha of destination are cleared. Neither the source nor the destination is used as input.

With Fs=0 and Fd=0:

$$Cd=0$$

$$Ad=0$$

SRC public final static int SRC

Porter-Duff Source rule. The source is copied to the destination. The destination is not used as input.

With Fs=1 and Fd=0:

$$Cd=Cs$$

$$Ad=As$$

SRC_OVER public final static int SRC_OVER

Porter-Duff Source Over Destination rule. The source is composited over the destination.

With Fs=1 and Ed=(1−As):

$$Cd=Cs+Cd*(1-As)$$

$$Ad=As+Ad*(1-As)$$

DST_OVER public final static int DST_OVER

Porter-Duff Destination Over Source rule. The destination is composited over the source and the result replaces the destination.
With Fs=(1−Ad) and Fd=1:

$$Cd=Cs*(1-Ad)+Cd$$

$$Ad=As*(1-Ad)+Ad$$

SRC_IN public final static int SRC_IN

Porter-Duff Source In Destination rule. The part of the source lying inside of the destination replaces the destination.

With Fs=Ad and Fd=0:

$$Cd=Cs*Ad$$

$$Ad=As*Ad$$

DST_IN public final static int DST_IN

Porter-Duff Destination In Source rule. The part of the destination lying inside of the source replaces the destination.

With Fs=0 and Fd=As:

$$Cd=Cd*As$$

$$Ad=Ad*As$$

SRC_OUT public final static int SRC_OUT

Porter-Duff Source Held Out By Destination rule. The part of the source lying outside of the destination replaces the destination.

With Fs=(1−Ad) and Fd=0:

$$Cd=Cs*(1-Ad)$$

$$Ad=As*(1-Ad)$$

DST_OUT public final static int DST_OUT

Porter-Duff Destination Held Out By Source rule. The part of the destination lying outside of the source replaces the destination.

With Fs=0 and Fd=(1−As):

$$Cd=Cd*(1-As)$$

$$Ad=Ad*(1-As)$$

Methods of AlphaComposite Class getInstance public static AlphaComposite getInstance(int rule)

Returns an AlphaComposite object with the given rule.

Parameters:

rule—Rule for the composition.

getInstance public static AlphaComposite getInstance(int rule, float alpha)

Returns an AlphaComposite object with the given rule and the constant alpha to multiply with the alpha of the source. The source is multiplied with the given alpha before being composited with the destination.

Parameters:

rule—Rule for the composition.

alpha—The constant alpha to be multiplied with the alpha of the source.

Alpha should be a floating point number in the range 0.0–1.0.

createContext public CompositeContext createContext(ColorModel srcColorModel,

ColorModel dstColorModel)

Creates a context for the compositing operation. The context contains state that is used in performing compositing operations.

Parameters:

srcColorModel—The ColorModel of the source.

dstColorModel—The ColorModel of the destination.

Returns:

The CompositeContext object to be used to perform compositing operations.

getAlpha public float getAlpha( )

Returns the additional alpha value that was given when this AlphaComposite instance was created. If this instance was created without the additional alpha value, the value 1.0 is returned.

getRule public int getRule( )

Returns the compositing rule that was specified when this AlphaComposite instance was created.

Figure 2:
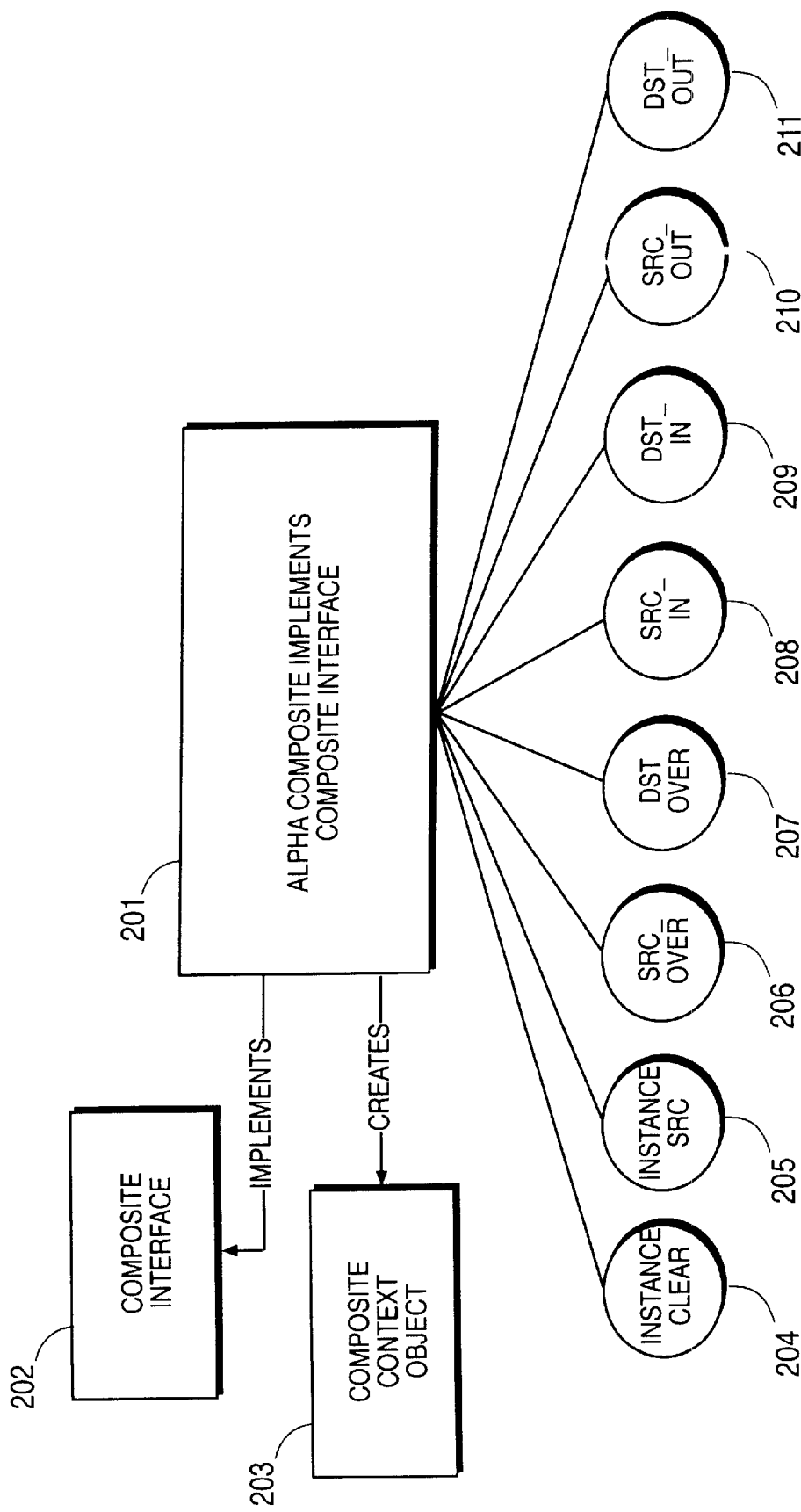
FIG. 2 demonstrates the instantiation of multiple instances of the AlphaComposite class in the present invention.

FIG. 2 illustrates the creation of multiple instances of the AlphaComposite class using the preferred embodiment of the present invention. The AlphaComposite class 201 is defined for performing compositing operations. Class 201 implements Composite interface 202. The Composite interface allows creation of a CompositeContext object for performing compositing operations according to one of the predefined rules.

A CompositeContext object 203 is created by the AlphaComposite class (or any other defined class that implements the Composite interface) when requested by a Graphics2D object or any other object which uses a class implementing the Composite interface for purposes of performing compositing during rendering. The CompositeContext object defines the environment for a compositing operation. Instances of the AlphaComposite class 201 may be instantiated as shown by instances 204–211 in FIG. 2. In the example of FIG. 2, each of the instances represents a rule to control a compositing operation. Instance 204 represents the CLEAR rule, instance 205 represents the SRC rule, instance 206 the SRC_OVER rule, instance 207 the DST_OVER rule, instance 208 the SRC_OUT rule, instance 209 the DST_IN rule, instance 210 the SRC_OUT rule, and instance 211 the DST_OUT rule.

Figure 3:
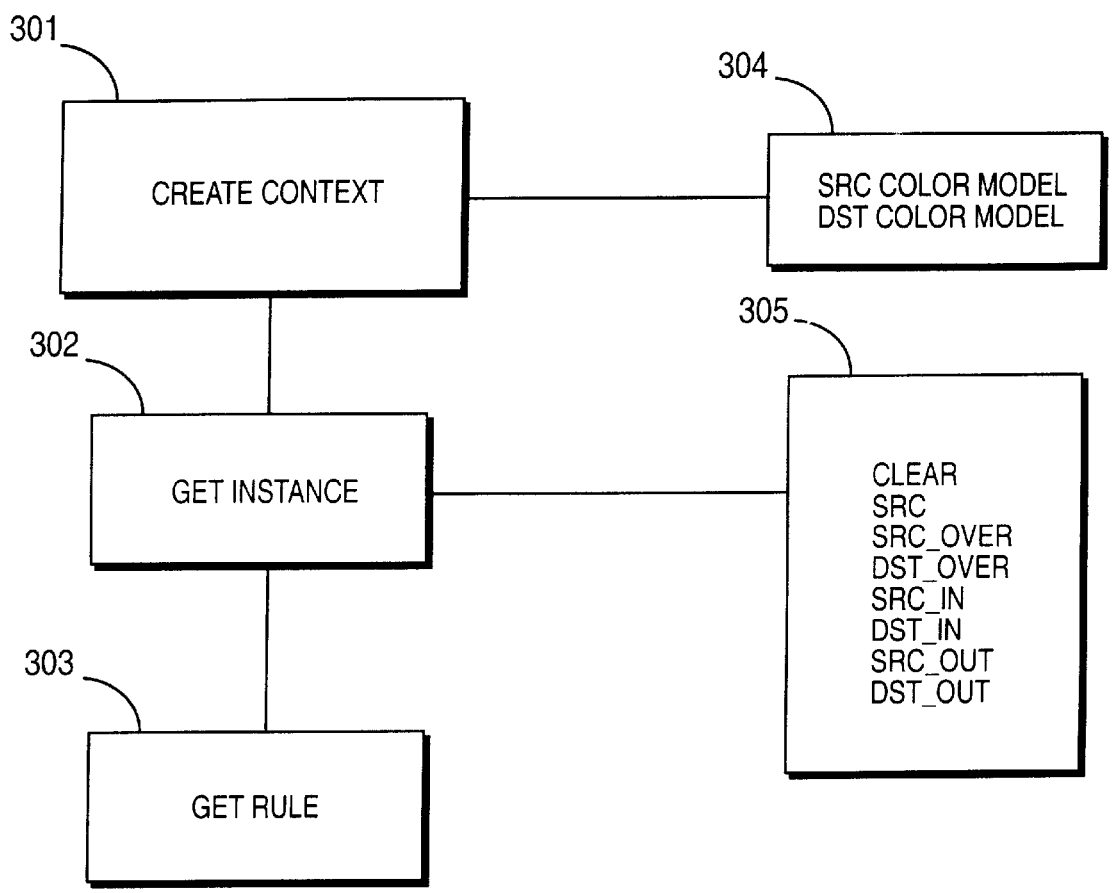
FIG. 3 illustrates an example of the operation of a compositing class.

The AlphaComposite class is just one example of a class that implements the Composite interface. By taking advantage of the present invention, other compositing classes can be defined as desired. An example of the form that a compositing class should follow is illustrated in FIG. 3. In the preferred embodiment, a compositing class should be able to create a context as illustrated at block 301. Parameters for the context may include a srcColorModel and a dstColorModel as shown at block 304. The compositing class should be able to provide instances of itself which support compositing operations using one or more algorithms, e.g., by supporting a set of predefined rules, as illustrated at block 302. In the example shown, the rules are the alpha compositing rules of block 305 and described above in the AlphaComposite class. A compositing class may also be able to return information about the particular compositing algorithm implemented by an instance of the class, e.g., by indicating one of a set of predefined rules, as shown at block 303.

Thus, a method and apparatus for providing programmable pixel composition has been described.

Appendix A

Computer Graphics   Volume 18, Number 3   July 1984

Compositing Digital Images

Thomas Porter
Tom Duff†

Computer Graphics Project
Lucasfilm Ltd.

ABSTRACT

Most computer graphics pictures have been computed all at once, so that the rendering program takes care of all elations relating to the overlap of objects. There are several applications, however, where elements must be rendered separately, relying on compositing techniques for the anti-aliased accumulation of the full image. This paper presents the case for four-channel pictures, demonstrating that a matte component can be computed similarly to the color channels. The paper discusses guidelines for the generation of elements and the arithmetic for their arbitrary compositing.

CR Categories and Subject Descriptors: I.3.3 [Computer Graphics]: Picture/Image Generations — Display algorithms; I.3.4 [Computer Graphics]: Graphics Utilities — Software support; I.4.1 [Image Processing]: Digitization — Sampling.

General Terms: Algorithms

Additional Key Words and Phrases: compositing, matte channel, matte algebra, visible surface algorithms, graphics systems

---

† Author's current address: AT&T Bell Laboratories, Murray Hill, NJ 07974, Room 2C-464

Permission to copy without fee all or part of this material is granted provided that the copies are not made or distributed for direct commercial advantage, the ACM copyright notice and the title of the publication and its date appear, and notice is given that copying is by permission of the Association for Computing Machinery. To copy otherwise, or to republish, requires a fee and/or specific permission.

© 1984 ACM 0-89791-138-5/84/007/0253 $00.75

1. Introduction

Increasingly, we find that a complex three dimensional scene cannot be fully rendered by a single program. The wealth of literature on rendering polygons and curved surfaces, handling the special cases of fractals and spheres and quadrics and triangles, implementing refinements for texture mapping and bump mapping, noting speed-ups on the basis of coherence or depth complexity in the scene, suggests that multiple programs are necessary.

In fact, reliance on a single program for rendering an entire scene is a poor strategy for minimizing the cost of small modeling errors. Experience has taught us to break down large bodies of source code into separate modules in order to save compilation time. An error in one routine forces only the recompilation of its module and the relatively quick reloading of the entire program. Similarly, small errors in coloration or design in one object should not force the "recompilation" of an entire image.

Separating the image into elements which can be independently rendered saves enormous time. Each element has an associated matte, coverage information which designates the shape of the element. The compositing of those elements makes use of the mattes to accumulate the final image.

The compositing methodology must not induce aliasing in the image; soft edges of the elements must be honored in computing the final image. Features should be provided to exploit the full associativity of the compositing process; this affords flexibility, for example, for the accumulation of several foreground elements into an aggregate foreground which can be examined over different backgrounds. The compositor should provide facilities for arbitrary dissolves and fades of elements during an animated sequence.

Several highly successful rendering algorithms have worked by reducing their environments to pieces that can be combined in a 2 1/2 dimensional manner, and then overlaying them either front-to-back or back-to-front [3]. Whitted and Weimar's graphics test-bed [8] and Crow's image generation environment [2] are both designed to deal with heterogenously rendered elements. Whitted

✦SIGGRAPH'84 and Weimar's system reduces all objects to horizontal spans which are composited using a Warnock-like algorithm. In Crow's system a supervisory process decides the order in which to combine images created by independent special-purpose rendering processes. The imaging system of Warnock and Wyatt [5] incorporates 1-bit mattes. The Hanna-Barbera cartoon animation system [4] incorporates soft-edge mattes, representing the opacity information in a less convenient manner than that proposed here. The present paper presents guidelines for rendering elements and introduces the algebra for compositing.

2. The Alpha Channel

A separate component is needed to retain the matte information, the extent of coverage of an element at a pixel. In a full color rendering of an element, the RGB components retain only the color. In order to place the element over an arbitrary background, a mixing factor is required at every pixel to control the linear interpolation of foreground and background colors. In general, there is no way to encode this component as part of the color information. For anti-aliasing purposes, this mixing factor needs to be of comparable resolution to the color channels. Let us call this an *alpha* channel, and let us treat an alpha of 0 to indicate no coverage, 1 to mean full coverage, with fractions corresponding to partial coverage.

In an environment where the compositing of elements is required, we see the need for an alpha channel as an integral part of all pictures. Because mattes are naturally computed along with the picture, a separate alpha component in the frame buffer is appropriate. Off-line storage of alpha information along with color works conveniently into run-length encoding schemes because the alpha information tends to abide by the same runs.

What is the meaning of the quadruple $(r,g,b,\alpha)$ at a pixel? How do we express that a pixel is half covered by a full red object? One obvious suggestion is to assign $(1,0,0,.5)$ to that pixel: the .5 indicates the coverage and the $(1,0,0)$ is the color. There are a few reasons to dismiss this proposal, the most severe being that all compositing operations will involve multiplying the 1 in the red channel by the .5 in the alpha channel to compute the red contribution of this object at this pixel. The desire to avoid this multiplication points up a better solution, storing the *pre-multiplied* value in the color component, so that $(.5,0,0,.5)$ will indicate a full red object half covering a pixel.

The quadruple $(r,g,b,\alpha)$ indicates that the pixel is $\alpha$ covered by the color $(r/\alpha, g/\alpha, b/\alpha)$. A quadruple where the alpha component is less than a color component indicates a color outside the [0,1] interval, which is somewhat unusual. We will see later that luminescent objects can be usefully represented in this way. For the representation of normal objects, an alpha of 0 at a pixel generally forces the color components to be 0. Thus the RGB channels record the true colors where alpha is 1, linearly darkened colors for fractional alphas along edges, and black where alpha is 0. Silhouette edges of RGBA elements thus exhibit their anti-aliased nature when viewed on an RGB monitor.

It is important to distinguish between two key pixel representations:

$black = (0,0,0,1);$
$clear = (0,0,0,0).$

The former pixel is an opaque black; the latter pixel is transparent.

3. RGBA Pictures

If we survey the variety of elements which contribute to a complex animation, we find many complete background images which have an alpha of 1 everywhere. Among foreground elements, we find that the color components roll off in step with the alpha channel, leaving large areas of transparency. Mattes, colorless stencils used for controlling the compositing of other elements, have 0 in their RGB components. Off-line storage of RGBA pictures should therefore provide the natural data compression for handling the RGB pixels of backgrounds, RGBA pixels of foregrounds, and A pixels of mattes.

There are some objections to computing with these RGBA pictures. Storage of the color components pre-multiplied by the alpha would seem to unduly quantize the color resolution, especially as alpha approaches 0. However, because any compositing of the picture will require that multiplication anyway, storage of the product forces only a very minor loss of precision in this regard. Color extraction, to compute in a different color space for example, becomes more difficult. We must recover $(r/\alpha, g/\alpha, b/\alpha)$, and once again, as alpha approaches 0, the precision fails off sharply. For our applications, this has yet to affect us.

4. The Algebra of Compositing

Given this standard of RGBA pictures, let us examine how compositing works. We shall do this by enumerating the complete set of binary compositing operations. For each of these, we shall present a formula for computing the contribution of each of two input pictures to the output composite at each pixel. We shall pay particular attention to the output pixels, to see that they remain pre-multiplied by their alpha.

4.1. Assumptions

When blending pictures together, we do not have information about overlap of coverage information within a pixel; all we have is an alpha value. When we consider the mixing of two pictures at a pixel, we must make some assumption about the interplay of the two alpha values. In order to examine that interplay, let us first consider the overlap of two semi-transparent elements like haze, then consider the overlap of two opaque, hard-edged elements.

If $\alpha_A$ and $\alpha_B$ represent the opaqueness of semi-transparent objects which fully cover the pixel, the computation is well known. Each object lets $(1-\alpha)$ of the background through, so that the background shows through only $(1-\alpha_A)(1-\alpha_B)$ of the pixel. $\alpha_A(1-\alpha_B)$ of the background is blocked by object A and passed by object B; $(1-\alpha_A)\alpha_B$ of the background is passed by A and blocked by B. This leaves $\alpha_A\alpha_B$ of the pixel which we can consider to be blocked by both.

If $\alpha_A$ and $\alpha_B$ represent subpixel areas covered by opaque geometric objects, the overlap of objects within the pixel is quite arbitrary. We know that object A divides the pixel into two subpixel areas of ratio $\alpha_A:1-\alpha_A$. We know that object B divides the pixel into two subpixel areas of ratio $\alpha_B:1-\alpha_B$. Lacking further information, we make the following assumption: *there is nothing special about the shape of the pixel; we expect that object B will divide each of the subpixel areas inside and outside of object A into the same ratio $\alpha_B:1-\alpha_B$.* The result of the assumption is the same arithmetic as with semi-transparent objects and is summarized in the following table:

| description | area |
|---|---|
| $\overline{A}\cap\overline{B}$ | $(1-\alpha_A)(1-\alpha_B)$ |
| $A\cap\overline{B}$ | $\alpha_A(1-\alpha_B)$ |
| $\overline{A}\cap B$ | $(1-\alpha_A)\alpha_B$ |
| $A\cap B$ | $\alpha_A\alpha_B$ |

The assumption is quite good for most mattes, though it can be improved if we know that the coverage seldom overlaps (adjacent segments of a continuous line) or always overlaps (repeated application of a picture). For ease in presentation throughout this paper, let us make this assumption and consider the alpha values as representing subpixel coverage of opaque objects.

4.2. Compositing Operators

Consider two pictures A and B. They divide each pixel into the 4 subpixel areas

| B | A | name | description | choices |
|---|---|---|---|---|
| 0 | 0 | 0 | $\overline{A}\cap\overline{B}$ | 0 |
| 0 | 1 | A | $A\cap\overline{B}$ | 0, A |
| 1 | 0 | B | $\overline{A}\cap B$ | 0, B |
| 1 | 1 | AB | $A\cap B$ | 0, A, B | listed in this table along with the choices in each area for contributing to the composite. In the last area, for example, because both input pictures exist there, either could survive to the composite. Alternatively, the composite could be clear in that area.

A particular binary compositing operation can be identified as a quadruple indicating the input picture which contributes to the composite in each of the four subpixel areas 0, A, B, AB of the table above. With three choices where the pictures intersect, two where only one picture exists and one outside the two pictures, there are $3\times 2\times 2\times 1 = 12$ distinct compositing operations listed in the table below. Note that pictures A and B are diagrammed as covering the pixel with triangular wedges whose overlap conforms to the assumption above.

| operation | quadruple | diagram | $F_A$ | $F_B$ |
|---|---|---|---|---|
| clear | (0,0,0,0) | | 0 | 0 |
| A | (0,A,0,A) | | 1 | 0 |
| B | (0,0,B,B) | | 0 | 1 |
| A over B | (0,A,B,A) | | 1 | $1-\alpha_A$ |
| B over A | (0,A,B,B) | | $1-\alpha_B$ | 1 |
| A in B | (0,0,0,A) | | $\alpha_B$ | 0 |
| B in A | (0,0,0,B) | | 0 | $\alpha_A$ |
| A out B | (0,A,0,0) | | $1-\alpha_B$ | 0 |
| B out A | (0,0,B,0) | | 0 | $1-\alpha_A$ |
| A atop B | (0,0,B,A) | | $\alpha_B$ | $1-\alpha_A$ |
| B atop A | (0,A,0,B) | | $1-\alpha_B$ | $\alpha_A$ |
| A xor B | (0,A,B,0) | | $1-\alpha_B$ | $1-\alpha_A$ |

Useful operators include *A over B*, *A in B*, and *A held out by B*. *A over B* is the placement of foreground A in front of background B. *A in B* refers only to that part of A inside picture B. *A held out by B*, normally shortened to *A out B*, refers only to that part of A outside picture B. For completeness, we include the less useful operators *A atop B* and *A xor B*. *A atop B* is the union of *A in B* and *B out A*. Thus, *paper atop table* includes *paper* where it is on top of *table*, and *table* otherwise; area beyond the edge of the table is out of the picture. *A xor B* is the union of *A out B* and *B out A*.

SIGGRAPH'84

4.3. Compositing Arithmetic

For each of the compositing operations, we would like to compute the contribution of each input picture at each pixel. This is quite easily solved by recognizing that each input picture survives in the composite pixel only within its own matte. For each input picture, we are looking for that fraction of its own matte which prevails in the output. By definition then, the alpha value of the composite, the total area of the pixel covered, can be computed by adding $\alpha_A$ times its fraction $F_A$ to $\alpha_B$ times its fraction $F_B$.

The color of the composite can be computed on a component basis by adding the color of the picture A times its fraction to the color of picture B times its fraction. To see this, let $c_A$, $c_B$, and $c_O$ be some color component of pictures A, B and the composite, and let $C_A$, $C_B$, and $C_O$ be the true color component before pre-multiplication by alpha. Then we have $$c_O = \alpha_O C_O$$

Now $C_O$ can be computed by averaging contributions made by $C_A$ and $C_B$, so $$c_O = \alpha_O \frac{\alpha_A F_A C_A + \alpha_B F_B C_B}{\alpha_A F_A + \alpha_B F_B}$$

but the denominator is just $\alpha_O$ so $$c_O = \alpha_A F_A C_A + \alpha_B F_B C_B$$
$$= \alpha_A F_A \frac{c_A}{\alpha_A} + \alpha_B F_B \frac{c_B}{\alpha_B}$$
$$= c_A F_A + c_B F_B \qquad (1)$$

Because each of the input colors is pre-multiplied by its alpha, and we are adding contributions from non-overlapping areas, the sum will be effectively pre-multiplied by the alpha value of the composite just computed. The pleasant result that the color channels are handled with the same computation as alpha can be traced back to our decision to store pre-multiplied RGBA quadruples. Thus the problem is reduced to finding a table of fractions $F_A$ and $F_B$ which indicate the extent of contribution of A and B, plugging these values into equation 1 for both the color and the alpha components.

By our assumptions above, the fractions are quickly determined by examining the pixel diagram included in the table of operations. Those fractions are listed in the $F_A$ and $F_B$ columns of the table. For example, in the $A$ over $B$ case, picture A survives everywhere while picture B survives only outside picture A, so the corresponding fractions are 1 and $(1-\alpha_A)$. Substituting into equation 1, we find $$c_O = c_A \times 1 + c_B \times (1-\alpha_A).$$

This is almost the well used linear interpolation of foreground F with background B $$B' = F \times \alpha + B \times (1-\alpha),$$

except that our foreground is pre-multiplied by alpha.

4.4. Unary operators

To assist us in dissolving and in balancing color brightness of elements contributing to a composite, it is useful to introduce a darken factor $\phi$ and a dissolve factor $\delta$:

$$\text{darken}(A,\phi) \equiv (\phi r_A, \phi g_A, \phi b_A, \alpha_A)$$
$$\text{dissolve}(A,\delta) \equiv (\delta r_A, \delta g_A, \delta b_A, \delta \alpha_A).$$

Normally, $0 \leq \phi, \delta \leq 1$ although none of the theory requires it.

As $\phi$ varies from 1 to 0, the element will change from normal to complete blackness. If $\phi > 1$ the element will be brightened. As $\delta$ goes from 1 to 0, the element will gradually fade from view.

Luminescent objects, which add color information without obscuring the background, can be handled with the introduction of a opaqueness factor $\omega$, $0 \leq \omega \leq 1$:

$$\text{opaque}(A,\omega) \equiv (r_A, g_A, b_A, \omega \alpha_A).$$

As $\omega$ varies from 1 to 0, the element will change from normal coverage over the background to no obscuration. This scaling of the alpha channel alone will cause pixel quadruples where $\alpha$ is less than a color component, indicating a representation of a color outside of the normal range. This possibility forces us to clip the output composite to the [0,1] range.

An $\omega$ of 0 will produce quadruples $(r,g,b,0)$ which do have meaning. The color channels, pre-multiplied by the original alpha, can be plugged into equation 1 as always. The alpha channel of 0 indicates that this pixel will obscure nothing. In terms of our methodology for examining subpixel areas, we should understand that using the opaque operator corresponds to shrinking the matte coverage with regard to the color coverage.

4.5. The PLUS operator

We find it useful to include one further binary compositing operator plus. The expression $A$ plus $B$ holds no notion of precedence in any area covered by both pictures; the components are simply added. This allows us to dissolve from one picture to another by specifying $$\text{dissolve}(A,\alpha) \text{ plus dissolve}(B,1-\alpha).$$

In terms of the binary operators above, plus allows both pictures to survive in the subpixel area AB. The operator table above should be appended:

| operation | diagram | $F_A$ | $F_B$ |
|---|---|---|---|
| {0,A,B,AB} | | 1 | 1 |
| A plus B | | | |

Computer Graphics  Volume 18, Number 3  July 1984

6. Examples

The operations on one and two pictures are presented as a basis for handling compositing expressions involving several pictures. A normal case involving three pictures is the compositing of a foreground picture A over a background picture B, with regard to an independent matte C. The expression for this compositing operation is $$(A \text{ in } C) \text{ over } B.$$

Using equation 1 twice, we find that the composite in this case is computed at each pixel by $$c_O = c_A \alpha_C + c_B(1-\alpha_A \alpha_C).$$

As an example of a complex compositing expression, let us consider a subwindow of Rob Cook's picture *Road to Point Reyes* [1]. This still frame was assembled from many elements according to the following rules:

$Foreground = FrgdGrass$ over $Rock$ over $Fence$ over $Shadow$ over $BkgdGrass$;

$GlossyRoad = Puddle$ over ($PostReflection$ atop ($PlantReflection$ atop $Road$));

$Hillside = Plant$ over $GlossyRoad$ over $Hill$;

$Background = Rainbow$ plus $Darkbow$ over $Mountains$ over $Sky$;

$Pt.Reyes = Foreground$ over $Hillside$ over $Background$.

Figure 1 shows three intermediate composites and the final picture.

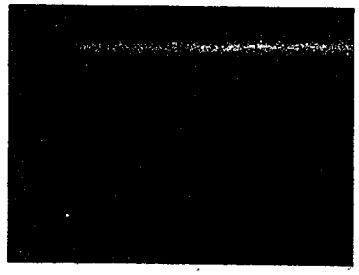

$Foreground = FrgdGrass$ over $Rock$ over $Fence$ over $Shadow$ over $BkgdGrass$;

$Hillside = Plant$ over $GlossyRoad$ over $Hill$;

$Background = Rainbow$ plus $Darkbow$ over $Mountains$ over $Sky$.

$Pt.Reyes = Foreground$ over $Hillside$ over $Background$.

Figure 1

A further example demonstrates the problem of correlated mattes. In Figure 2, we have a star field background, a planet element, fiery particles behind the planet, and fiery particles in front of the planet. We wish to add the luminous fires, obscure the planet, darkened for proper balance, with the aggregate fire matte, and place that over the star field. An expression for this compositing is (FFire plus (BFire out Planet))
over darken(Planet,.3) over Stars.

We must remember that our basic assumption about the division of subpixel areas by geometric objects breaks down in the face of input pictures with correlated mattes. When one picture appears twice in a compositing expression, we must take care with our computations of $F_A$ and $F_B$. Those listed in the table are correct only for uncorrelated pictures.

To solve the problem of correlated mattes, we must extend our methodology to handle n pictures: we must examine all $2^n$ subareas of the pixel, deciding which of the pictures survives in each area, and adding up all contributions. Multiple instances of a single picture or pictures with correlated mattes are resolved by aligning their pixel coverage. Example 2 can be computed by building a table of survivors (shown below) to accumulate the extent to which each input picture survives in the composite.

| FFire | BFire | Planet | Stars | Survivor |
|---|---|---|---|---|
|  |  |  | • | Stars |
|  |  | • |  | Planet |
|  |  | • | • | Planet |
|  | • |  |  | BFire |
|  | • |  | • | BFire |
|  | • | • |  | Planet |
|  | • | • | • | Planet |
| • |  |  |  | FFire |
| • |  |  | • | FFire |
| • |  | • |  | FFire |
| • |  | • | • | FFire |
| • | • |  |  | FFire,BFire |
| • | • |  | • | FFire,BFire |
| • | • | • |  | FFire |
| • | • | • | • | FFire |

6. Conclusion

We have pointed out the need for matte channels in synthetic pictures, suggesting that frame buffer hardware should offer this facility. We have seen the convenience of the RGBA scheme for integrating the matte channel. A language of operators has been presented for conveying a full range of compositing expressions. We have discussed a methodology for deciding compositing questions at the subpixel level, deriving a simple equation for handling all composites of two pictures. The methodology is extended to multiple pictures, and the language is embellished to handle darkening, attenuation, and opaqueness.

There are several problems to be resolved in related areas, which are open for future research. We are interested in methods for breaking arbitrary three dimensional scenes into elements separated in depth. Such elements are equivalent to clusters, which have been a subject of discussion since the earliest attempts at hidden surface elimination. We are interested in applying the compositing notions to Z-buffer algorithms, where depth information is retained at each pixel.

7. References

1. Cook, R. Road to Point Reyes. *Computer Graphics* Vol 17, No. 3 (1983), Title Page Picture.
2. Crow, F. C. A More Flexible Image Generation Environment. *Computer Graphics* Vol. 16, No. 3 (1982), pp. 9-18.
3. Newell, M. G., Newell, R. G., and Sancha, T. L. A Solution to the Hidden Surface Problem, pp. 443-448. *Proceedings of the 1972 ACM National Conference.*
4. Wallace, Bruce. Merging and Transformation of Raster Images for Cartoon Animation. *Computer Graphics* Vol. 15, No. 3 (1981), pp. 253-262.
5. Warnock, John, and Wyatt, Douglas. A Device Independent Graphics Imaging Model for Use with Raster Devices. *Computer Graphics* Vol. 16, No. 3 (1982), pp. 313-319.
6. Whitted, Turner, and Weimer, David. A Software Test-Bed for the Development of 3-D Raster Graphics Systems. *Computer Graphics* Vol. 15, No. 3 (1981), pp. 271-277.

8. Acknowledgments

The use of mattes to control the compositing of pictures is not new. The graphics group at the New York Institute of Technology has been using this for years. NYIT color maps were designed to encode both color and matte information; that idea was extended in the Ampex AVA system for storing mattes with pictures. Credit should be given to Ed Catmull, Alvy Ray Smith, and Ikonas Graphics Systems for the existence of an alpha channel as an integral part of a frame buffer, which has paved the way for the developments presented in this paper.

The graphics group at Lucasfilm should be credited with providing a fine test bed for working out these ideas. Furthermore, certain ideas incorporated as part of this work have their origins as idle comments within this group. Thanks are also given to Rodney Stock for comments on an early draft which forced the authors to clarify the major assumptions.

What is claimed is:

1. In an object-oriented computer system, a method for defining compositing operations in a graphics environment, said method comprising the steps of:
creating a first object comprising a rendering method;
creating a second object, said second object defining rules for a compositing operation, said second object comprising a method for creating an instance of a third object;
creating said third object, said third object comprising a method for compositing image elements.

2. The method of claim 1 further comprising the step of said second object implementing a composite interface.

3. The method of claim 2 further comprising the step of defining in said composite interface said method for creating instances.

4. The method of claim 1 further comprising the step of setting said second object as a rendering attribute of said first object.

5. The method of claim 1 further comprising the step of said third object implementing a composite context interface.

6. The method of claim 5 further comprising the step of defining in said composite context interface said method for compositing.

7. The method of claim 1 further comprising the step of said third object maintaining state for said compositing operation.

8. The method of claim 1 further comprising the step of invoking said method for compositing when said rendering method is executed.

9. The method of claim 8, wherein said step of invoking said method for compositing comprises the step of passing at least one source image element and a destination image element to said third object.

10. The method of claim 1 further comprising the step of creating multiple instances of said third object in a multi-threaded environment.

11. The method of claim 1, wherein said step of creating said third object comprises the step of passing a source color representation and a destination color representation to said third object to define a compositing environment.

12. The method of claim 1, wherein said second object comprises an alpha composite object, and said step of creating said second object comprises the step of passing a rule argument and an alpha value.

13. The method of claim 12, wherein said alpha value comprises at least one increased level of transparency for at least one destination pixel.

14. The method of claim 1 wherein said method for compositing image elements comprises a method of combining source pixels with destination pixels.

15. The method of claim 1 wherein said method for compositing image elements comprises a method of blending pixels from more than one source into a destination image.

16. The method of claim 1 wherein said method for compositing image elements comprises a method of rotating a set of image points into a new set of image points.

17. The method of claim 1 wherein said method for compositing image elements comprises a method of translating a set of image points into a new set of image points.

18. The method of claim 1 wherein said method for compositing image elements comprises a method of scaling a set of image points into a new set of image points.

19. The method of claim 1 wherein said method for compositing image elements comprises a method of rotating an image path into a new image path.

20. The method of claim 1 wherein said method for compositing image elements comprises a method of translating an image path into a new image path.

21. The method of claim 1 wherein said method for compositing image elements comprises a method of scaling an image path into a new image path.

22. In an object-oriented computer system, a method for defining compositing operations in a graphics environment, said method comprising the steps of:
creating a first object comprising a rendering method;
creating a second object, said second object implementing a composite interface, said second object defining rules for a compositing operation, said second object comprising a method for creating an instance of a third object;
setting said second object as a rendering attribute of said first object;
creating said third object, wherein said creating said third object comprises passing a source color representation and a destination color representation to said third object to define a compositing environment, said third object implementing a composite context interface, said third object comprising a method for compositing image elements, said third object maintaining state for said compositing operation;
invoking said method for compositing when said rendering method is executed, wherein said step of invoking comprises passing at least one source image element and a destination image element to said third object.

23. A computer system comprising:
a processor;
program code executed by said processor, said program code comprising;
a first object comprising a rendering method;
a second object defining rules for a compositing operation, said second object comprising a method for creating an instance of a third object;
said third object comprising a method for compositing image elements.

24. The computer system of claim 23, further comprising said second object implementing a composite interface.

25. The computer system of claim 24, wherein said composite interface defines said method for creating instances.

26. The computer system of claim 23, further comprising said a second object set as a rendering attribute of said first object.

27. The computer system of claim 23, further comprising said third object implementing a composite context interface.

28. The computer system of claim 27, wherein said composite context interface defines said method for compositing.

29. The computer system of claim 23, further comprising said third object maintaining state for said compositing operation.

30. The computer system of claim 23, further comprising invoking said method for compositing when said rendering method is executed.

31. The computer system of claim 30, wherein said method for compositing accepts as arguments at least one source image element and a destination image element.

32. The computer system of claim 23 further comprising multiple instances of said third object in a multi-threaded environment.

33. The computer system of claim 23, wherein said third object defines a compositing environment based upon arguments provided to said method for creating an instance.

34. The computer system of claim 23, wherein said second object comprises an alpha composite object implementing one of multiple defined alpha compositing rules.

35. The computer system of claim 34, wherein said one of multiple defined alpha compositing rules comprises at least one increased level of transparency for at least one destination pixel.

36. The computer system of claim 23 wherein said method for compositing image elements comprises a method of combining source pixels with destination pixels.

37. The computer system of claim 23 wherein said method for compositing image elements comprises a method of blending pixels from more than one source into a destination image.

38. The computer system of claim 23 wherein said method for compositing image elements comprises a method of rotating a set of image points into a new set of image points.

39. The computer system of claim 23 wherein said method for compositing image elements comprises a method of translating a set of image points into a new set of image points.

40. The computer system of claim 23 wherein said method for compositing image elements comprises a method of scaling a set of image points into a new set of image points.

41. The computer system of claim 23 wherein said method for compositing image elements comprises a method of rotating an image path into a new image path.

42. The computer system of claim 23 wherein said method for compositing image elements comprises a method of translating an image path into a new image path.

43. The computer system of claim 23 wherein said method for compositing image elements comprises a method of scaling an image path into a new image path.

44. A computer system comprising:

a processor;

program code executed by said processor, said program code comprising;

a first object comprising a rendering method;

a second object set as a rendering attribute of said first object, said second object implementing a composite interface and defining rules for a compositing operation, said second object comprising a method for creating an instance of a third object, wherein said creating said third object comprises passing a source color representation and a destination color representation to said third object to define a compositing environment;

said third object implementing a composite context interface, said third object maintaining state for said compositing operation and comprising a method for compositing image elements, wherein said method for compositing is invoked when said rendering method is executed, wherein said invoking comprises passing at least one source image element and a destination image element to said third object.

45. A computer program product comprising:

a computer usable medium having computer program code embodied therein for performing compositing operations in a graphics environment, said computer program product comprising:

computer program code configured to cause a computer to create a first object comprising a rendering method;

computer program code configured to cause a computer to create a second object, said second object defining rules for a compositing operation, said second object comprising a method for creating an instance of a third object;

computer program code configured to cause a computer to create said third object, said third object comprising a method for compositing image elements.

46. The computer program product of claim 45, further comprising said second object implementing a composite interface.

47. The computer program product of claim 46, wherein said method for creating instances is defined in said composite interface.

48. The computer program product of claim 45, further comprising computer program code configured to cause a computer to set said second object as a rendering attribute of said first object.

49. The computer program product of claim 45, further comprising said third object implementing a composite context interface.

50. The computer program product of claim 49, wherein said method for compositing is defined in said composite context interface.

51. The computer program product of claim 45, further comprising said third object maintaining state for said compositing operation.

52. The computer program product of claim 45, further comprising computer program code configured to cause a computer to invoke said method for compositing when said rendering method is executed.

53. The computer program product of claim 52, wherein said computer program code configured to cause a computer to invoke said method for compositing comprises computer program code configured to cause a computer to pass at least one source image element and a destination image element to said third object.

54. The computer program product of claim 45 further comprising computer program code configured to cause a computer to create multiple instances of said third object in a multi-threaded environment.

55. The computer program product of claim 45, wherein said computer program code configured to cause a computer to create said third object comprises computer program code configured to cause a computer to pass a source color representation and a destination color representation to said third object to define a compositing environment.

56. The computer program product of claim 45, wherein said second object comprises an alpha composite object, and said computer program code configured to cause a computer to create said second object comprises computer program code configured to cause a computer to pass a rule argument and an alpha value.

57. The computer program product of claim 56, wherein said alpha value comprises at least one increased level of transparency for at least one destination pixel.

58. The computer program product of claim 45 wherein said method for compositing image elements comprises a method of combining source pixels with destination pixels.

59. The computer program product of claim 45 wherein said method for compositing image elements comprises a method of blending pixels from more than one source into a destination image.

60. The computer program product of claim 45 wherein said method for compositing image elements comprises a method of rotating a set of image points into a new set of image points.

61. The computer program product of claim 45 wherein said method for compositing image elements comprises a method of translating a set of image points into a new set of image points.

62. The computer program product of claim 45 wherein said method for compositing image elements comprises a method of scaling a set of image points into a new set of image points.

63. The computer program product of claim 45 wherein said method for compositing image elements comprises a method of rotating an image path into a new image path.

64. The computer program product of claim 45 wherein said method for compositing image elements comprises a method of translating an image path into a new image path.

65. The computer program product of claim 45 wherein said method for compositing image elements comprises a method of scaling an image path into a new image path.

66. A computer program product comprising:
 a computer usable medium having computer program code embodied therein for performing compositing operations in a graphics environment, said computer program product comprising:
 computer program code configured to cause a computer to create a first object comprising a rendering method;
 computer program code configured to cause a computer to create a second object, said second object implementing a composite interface, said second object defining rules for a compositing operation, said second object comprising a method for creating an instance of a third object;
 computer program code configured to cause a computer to set said second object as a rendering attribute of said first object;
 computer program code configured to cause a computer to create said comprising a method for creating an instance of a third object;
 computer program code configured to cause a computer to set said second object as a rendering attribute of said first object;
 computer program code configured to cause a computer to create said third object, wherein said creating said third object comprises passing a source color representation and a destination color representation to said third object to define a compositing environment; said third object implementing a composite context interface, said third object comprising a method for compositing image elements, said third object maintaining state for said compositing operation;
 computer program code configured to cause a computer to invoke said method for compositing when said rendering method is executed, wherein said step of invoking comprises passing at least one source image element and a destination image element to said third object.

* * * * *